US012674041B2

(12) United States Patent
Zöllmer et al.

(10) Patent No.: US 12,674,041 B2
(45) Date of Patent: Jul. 7, 2026

(54) METHOD FOR PRODUCING 3D PRINTING MATERIAL AND COMPONENTS THEREFROM AND 3D PRINTING MATERIAL AND COMPONENT PRODUCED USING THE METHOD

(71) Applicant: FRAUNHOFER-GESELLSCHAFT ZUR FÖRDERUNG DER ANGEWANDTEN FORSCHUNG E.V., Munich (DE)

(72) Inventors: Volker Zöllmer, Bremen (DE); Arne Haberkorn, Bremen (DE); Cindy Behrens, Bremen (DE); Thorsten Müller, Bremen (DE); Imre Dekany, Szeged (HU)

(73) Assignee: FRAUNHOFER-GESELLSCHAFT ZUR FÖRDERUNG DER ANGEWANDTEN FORSCHUNG E. V., Munich (DE)

( * ) Notice: Subject to any disclaimer, the term of this patent is extended or adjusted under 35 U.S.C. 154(b) by 73 days.

(21) Appl. No.: 18/289,462

(22) PCT Filed: May 2, 2022

(86) PCT No.: PCT/EP2022/061730
§ 371 (c)(1),
(2) Date: Nov. 3, 2023

(87) PCT Pub. No.: WO2022/233798
PCT Pub. Date: Nov. 10, 2022

(65) Prior Publication Data
US 2024/0228749 A1      Jul. 11, 2024

(30) Foreign Application Priority Data
May 4, 2021     (DE) .......................... 102021111495.0

(51) Int. Cl.
| | |
|---|---|
| *C08K 9/02* | (2006.01) |
| *B29C 64/118* | (2017.01) |
| *B33Y 10/00* | (2015.01) |
| *B33Y 70/10* | (2020.01) |
| *C08K 3/22* | (2006.01) |

(52) U.S. Cl.
CPC .............. *C08K 9/02* (2013.01); *B29C 64/118* (2017.08); *B33Y 10/00* (2014.12); *B33Y 70/10* (2020.01); *C08K 2003/2241* (2013.01); *C08K 2003/2258* (2013.01); *C08K 2003/2262* (2013.01); *C08K 2003/2275* (2013.01); *C08K 2003/2293* (2013.01); *C08K 2003/2296* (2013.01)

(58) Field of Classification Search
CPC .... C08K 2003/2241; C08K 2003/2262; C08K 2003/2258; C08K 2003/2275; C08K 2003/2293; C08K 3/22; C08K 2003/2296; C08K 3/346; B33Y 70/10; C08L 77/00
USPC ........................................................ 524/445
See application file for complete search history.

(56) References Cited

U.S. PATENT DOCUMENTS

| | | | | |
|---|---|---|---|---|
| 9,102,576 | B1 * | 8/2015 | Spowart ................ | B32B 27/304 |
| 2011/0118384 | A1 | 5/2011 | Bugnon | |
| 2014/0187413 | A1 | 7/2014 | Lagaron et al. | |
| 2019/0233613 | A1 * | 8/2019 | Odent ...................... | C08K 9/04 |

FOREIGN PATENT DOCUMENTS

| | | |
|---|---|---|
| CN | 109174203 A | 1/2019 |
| DE | 102009013228 A1 | 9/2010 |
| DE | 102012219918 A1 | 4/2014 |
| WO | 2017140764 A1 | 8/2017 |

OTHER PUBLICATIONS

Tallosy, Szabolcs Peter et al., "Adhesion and inactivation of Gram-negative and Gram-positive bacteria on photoreactive TiO2/polymer and Ag—TiO2/polymer nanohybrid films," Applied Surface Science, vol. 371, pp. 139-150, Feb. 27, 2016.
Menesi, Judit et al., "Photocatalysis on silver-layer silicate/titanium dioxide composite thin films at solid/vapour interface," Catalysis Today, vol. 144, pp. 160-165, 2009.
International Search Report & Written Opinion for corresponding PCT Application No. PCT/EP2022/061730, dated Aug. 29, 2022.
German Search Report for corresponding DE 10 2021 111 495.0, dated Aug. 29, 2022.

* cited by examiner

*Primary Examiner* — Hannah J Pak
(74) *Attorney, Agent, or Firm* — MEAGHER, EMANUEL, LAKS, GOLDBERG & LIAO, LLP

(57) ABSTRACT
This invention relates to a method for producing 3D printing material. The method involves first producing, from at least one photocatalyst and at least one phyllosilicate, a photocatalyst-phyllosilicate composite; From the photocatalyst-phyllosilicate composite and at least one thermoplastic polymer, a photocatalyst-phyllosilicate-polymer composite is then produced. Finally, the photocatalyst-phyllosilicate-polymer composite is subjected to a shaping process, producing a 3D printing material. This invention also relates to a 3D printing material comprising a thermoplastic matrix and, embedded in the matrix, a composite material containing at least one photocatalyst and at least one phyllosilicate. This invention further relates to a method for producing components from the 3D printing material and a component produced using this method.

6 Claims, 5 Drawing Sheets

(A)                                                      (B)

METHOD FOR PRODUCING 3D PRINTING MATERIAL AND COMPONENTS THEREFROM AND 3D PRINTING MATERIAL AND COMPONENT PRODUCED USING THE METHOD

This invention relates to a method for producing 3D printing material. The method involves first producing, from at least one photocatalyst and at least one phyllosilicate, a photocatalyst-phyllosilicate composite; From the photocatalyst-phyllosilicate composite and at least one thermoplastic polymer, a photocatalyst-phyllosilicate-polymer composite is then produced. Finally, the photocatalyst-phyllosilicate-polymer composite is subjected to a shaping process, producing a 3D printing material. This invention also relates to a 3D printing material comprising a thermoplastic matrix and, embedded in the matrix, a composite material containing at least one photocatalyst and at least one phyllosilicate. This invention further relates to a method for producing components from the 3D printing material and a component produced using this method.

Thermoplastic polymers can, if they are in the form, e.g., of a granular semi-finished product, be compounded with, e.g., metallic, polymeric, ceramic, and/or carbon-containing fillers to form composites. The morphology and quantity of the fillers are decisive for the workability and the resulting properties of the composites.

These composites can be processed on all established systems and machines of the plastics industry; they can be extruded and undergo injection molding. Furthermore, they can also be processed using rolling, pressing, and calendering processes. Along with these processes, it is also possible to use generative processes to make composites into components with batch sizes all the way to 1.

Today, in addition to pure polymer fused filament fabrication (FFF) filaments, there are also numerous polymer composite FFF filaments for 3D printing. Using them, many components can be quickly and economically produced from different materials.

If these components are exposed to a bacterial or viral load, the surfaces of such components are normally contaminated with bacteria or viruses, and present a potential nucleus of infection.

A general possibility of removing bacterial or viral contamination is by photocatalysis. Earlier works were able to show that these photocatalysts also actively remove bacteria (Tallósy et al., Applied Surface Science, 2016, 371, 139-150).

Subsequent application of a photocatalytically active coating can possibly reduce the duration of contamination, and thus minimize the danger of a spread of infection. However, subsequent application of a coating is always time- and thus cost-intensive. Moreover, it is necessary to take into consideration the possibility that the coating will interact with the component.

There are numerous works on coating surfaces with (nano-) silver-containing, antibacterially active coatings. However, these are currently being criticized because of the possible toxicity of nanoscale metals.

A photocatalytic coating can also inactivate bacteria and viruses (Menesi et al, Catalysis Today 144 (2009) 160-165). However, the coating itself cannot always be optimally matched to the surfaces to be coated. For example, the surface to be coated can itself be damaged by photocatalysis.

DETAILED DESCRIPTION

Figure 1:
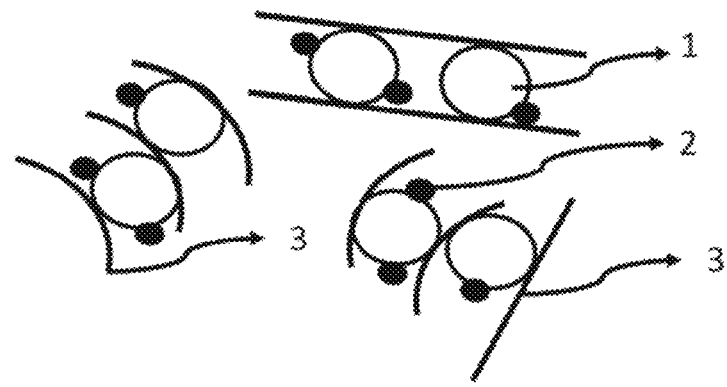
FIG. 1 is a schematic representation of a sample embodiment of the photocatalyst-phyllosilicate composite produced in step a) of the disclosed method.

Starting from this, it was the goal of this invention to indicate a 3D printing material production method that can produce a 3D printing material having antibacterial and/or antiviral properties from which it is possible, using 3D printing, to produce components having antibacterial and/or antiviral properties.

This is accomplished, with respect to a 3D printing material production method, by the features of the disclosed methods; with respect to a 3D printing material by the features of the disclosed materials; with respect to a component production method by the features of the disclosed methods; and with respect to a component by the features of the disclosed component. The respective dependent claims present advantageous further developments.

Thus, the invention indicates a method for producing (plastic) 3D printing material, this method involving a) producing, from at least one photocatalyst and at least one phyllosilicate, a photocatalyst-phyllosilicate composite;

b) producing, from the photocatalyst-phyllosilicate composite and at least one thermoplastic polymer, a photocatalyst-phyllosilicate-polymer composite; and c) subjecting the photocatalyst-phyllosilicate-polymer composite to a shaping process, yielding a (plastic) 3D-printing material.

The term (plastic) 3D printing material is understood to mean a material that can, without further processing, be used in a 3D printer as a starting material for 3D printing, so that using the 3D printer it is possible, by means of 3D printing, to produce components from the 3D printing material. Thus, the 3D printing material is suitable (because of its composition and its shape) for direct use in a 3D printer. The 3D printing material can be selected, for example, from the group consisting of 3D printing filaments (that is, filaments for 3D printing), 3D printing granulate (that is, granulate for 3D printing), and 3D printing rods (that is, rod-shaped material for 3D printing). The 3D printing filaments can be FFF filaments (fused filament fabrication filaments). The rod-shaped material for 3D printing can, like the filaments for 3D printing (continuous semi-finished product) be produced in an extrusion process, the material being cut to defined lengths after the extrusion to produce the rod-shaped material.

The first step in the inventive method is to produce, from (doped) photocatalysts (e.g., $TiO_2$ photocatalysts) and phyllosilicates, composites, for example, by intercallating the photocatalysts into phyllosilicates or adding the the photocatalysts onto phyllosilicates. The resulting (doped) photocatalyst-phyllosilicate composites are preferably formulated as powders, and can then be directly formulated first (e.g., in a compounding process) to (doped) photocatalyst-phyllosilicate-polymer composites. A further method step involves subjecting these (doped) photocatalyst-phyllosilicate-polymer composites to a shaping process. For example, the (doped) photocatalyst-phyllosilicate-polymer composites are extruded into FFF filaments. This described processing of the material can be done on established systems and machines of the plastics industry. The material is capable of being extruded and injection molded. Furthermore, it can also be processed through rolling, pressing, and calendering processes. Possible applications of the composite material that should be mentioned are especially the integrative processing technique of multi-injection molding for component functionalization.

In step a) of the inventive method, first a photocatalyst phyllosilicate composite is produced from at least one photocatalyst and at least one phyllosilicate. The photocatalyst-phyllosilicate composite can preferably be produced by intercallating the photocatalyst into the phyllosilicate or adding it onto the phyllosilicate. This can, by be accomplished, for example, by producing an aqueous suspension containing the photocatalyst and the phyllosilicate in the desired weight ratio, e.g., between 1:1 and 10:1, and then removing the water, yielding the photocatalyst-phyllosilicate composite in the form of a powder. Examples of photocatalysts that can be used are $TiO_2$ and $ZnO$. The photocatalyst can be doped, for example with Ag or Cu, or it can be doped during step a), for example with Ag or Cu. Alternatively, the photocatalyst can also be undoped. The phyllosilicate can be, e.g., hectorite, bentonite, or montmorillonite. Preferably, the photocatalyst-phyllosilicate composite produced in step a) is in the form of a powder.

In step b) of the inventive method, a photocatalyst-phyllosilicate-polymer composite is produced from the photocatalyst-phyllosilicate composite produced in step a) and at least one thermoplastic polymer. Preferably, this is done by compounding the photocatalyst-phyllosilicate composite with the at least one thermoplastic polymer. This involves using the photocatalyst-phyllosilicate composite and the thermoplastic polymer preferably in a weight ratio between 1:10 and 2:1. The at least one thermoplastic polymer is preferably at least one thermoplastic elastomer.

In step c) of the inventive method, the photocatalyst-phyllosilicate-polymer composite produced in step b) is finally subjected to a shaping process, yielding a 3D printing-material. For example, in step c) the photocatalyst-phyllosilicate-polymer composite can be subjected to an extrusion process, yielding a 3D printing material which is in the form of composite filaments and which can be used in corresponding 3D printers. According to an alternative example, in step c) the photocatalyst-phyllosilicate-polymer composite can be subjected to a granulation process, yielding a 3D printing material in the form of a composite granulate, which can be used in corresponding 3D printers.

The inventive method can be used to produce 3D printing material comprising a thermoplastic matrix and, embedded in the matrix, a composite material containing at least one photocatalyst and at least one phyllosilicate.

The photocatalyst contained in the inventive 3D printing material gives the 3D printing material, and thus also a component or a semi-finished product produced by means of 3D printing from the 3D printing material, a self-decontaminating effect. Because of this self-decontaminating effect, sunlight irradiation can inactivate bacteria and viruses, allowing the duration of contamination to be reduced and thus the danger of a spread of infection to be minimized.

Combining the—preferably doped—photocatalyst with phyllosilicates has a synergistic effect, allowing photocatalysis to achieve clearly higher efficiency. Thus, combining the photocatalyst with the phyllosilicate allows the substances that are to be broken down, that is, bacteria and viruses, to be brought into more effective contact with the photocatalyst, allowing their photocatalytic decomposition to be accelerated. Using the photocatalyst-phyllosilicate composite gives the inventive 3D printing material, and thus also a component or semi-finished product produced by means of 3D printing from the 3D printing material, very effective self-decontaminating activity.

Because the photocatalyst-phyllosilicate composite is integrated (in the form of a filler) into the thermoplastic polymer, the 3D printing material produced using the inventive method comprises a photocatalyst-phyllosilicate-polymer composite, giving the 3D printing material itself very effective self-decontaminating activity. Consequently, a component or semi-finished product produced by means of 3D printing from the 3D printing material also has, in and of itself, very effective self-decontaminating activity. Thus, the component no longer has to be (subsequently) provided with an additional photocatalytic coating, that is a coating having antibacterial and/or antiviral activity, to achieve decontaminating activity and provide protection against bacteria and viruses. Instead, the component has very effective protection against bacteria and viruses even without such a coating. Forgoing the additional coating of the component allows it to be produced much more quickly and economically.

Thus, the inventive method makes it possible to produce a 3D printing material which has antibacterial and/or antiviral properties and from which components having antibacterial and/or antiviral properties can be produced by means of 3D printing.

A preferred variant of the inventive method is characterized in that the at least one photocatalyst is selected from the group consisting of $TiO_2$, $ZnO$, $SnO_2$, $WO_3$, $Fe_2O_3$, $Fe_3O_4$, $MnO$, $NiO$, and mixtures thereof; and/or is doped with at least one metal, or is doped with at least one metal during step a), the at least one metal preferably being selected from the group consisting of Ag, Cu, Au, Pd, Pt, Rh, Cd, and mixtures thereof.

The use of $TiO_2$, $ZnO$, $SnO_2$, $WO_3$, $Fe_2O_3$, $Fe_3O_4$, $MnO$, $NiO$, or mixtures thereof as a photocatalyst makes it possible to achieve high antibacterial and antivirale activity. It is especially preferred if the at least one photocatalyst is $TiO_2$ and/or $ZnO$, quite especially preferred if it is $TiO_2$, since these make it possible to achieve especially high antibacterial and antiviral activity.

Doping the photocatalyst with at least one metal can affect or adjust the wavelength range in which photocatalysis can occur. For example, doping the photocatalyst with Ag can make photocatalysis occur in the visible range of light (e.g., wavelength>430 nm). It is especially preferred if the at least one metal with which the photocatalyst is or will be doped is Ag and/or Cu. It is very especially preferred if the at least one metal with which the photocatalyst is or will be doped is Cu.

According to another preferred variant of the inventive method, the at least one phyllosilicate is selected from the group consisting of hectorite, bentonite, montmorillonite, muscovite, illite, kaolinite, halloysite, palygorskite, vermiculite, and mixtures thereof. Use of these phyllosilicates can strongly increase the efficiency of photocatalysis. It is very especially preferred if the at least one phyllosilicate is a phyllosilicate selected from the group consisting of hectorite, bentonite, montmorillonite, and mixtures thereof. Use of these makes it possible to increase the efficiency of photocatalysis especially strongly.

In a very especially preferred variant of the inventive method the at least one photocatalyst is $TiO_2$ and/or ZnO, especially $TiO_2$;

the at least one photocatalyst is or will be is doped with Cu and/or Ag, especially with Cu; and the at least one phyllosilicate is selected from the group consisting of hectorite, bentonite, montmorillonite, and mixtures thereof.

Another preferred variant of the inventive method is characterized in that during the production of the photocatalyst-phyllosilicate composite in step a)

the weight ratio of the at least one photocatalyst to the at least one phyllosilicate lies in the range from 1:1 to 10:1; and/or the at least one photocatalyst is intercalated into the at least one phyllosilicate and/or is added onto the at least one phyllosilicate.

Another preferred variant of the inventive method is characterized in that during the production of the photocatalyst-phyllosilicate-polymer composite in step b)

the weight ratio of the photocatalyst-phyllosilicate composite to the at least one thermoplastic polymer lies in the range from 1:10 to 2:1; and/or the photocatalyst-phyllosilicate composite is compounded with the at least one thermoplastic polymer.

Furthermore, it is preferred that the 3D printing material contains, in step a), 10 to 75 weight %, preferably 20 to 60 weight %, of the at least one thermoplastic polymer, relative to the total weight of the 3D printing material to be produced; and/or in step a), 10 to 60 weight %, preferably 20 to 50 weight %, of the at least at least one photocatalyst, relative to the total weight of 3D printing material the to be produced; and/or in step b), 5 to 40 weight %, preferably 10 to 30 weight %, especially preferably 10 toh 20 weight %, of the at least one phyllosilicate, relative to the total weight of the 3D printing material to be produced.

According to another preferred variant of the inventive method, the at least one thermoplastic polymer is selected from the group consisting of polyamide 6 (PA 6), polyamide 66 (PA 66), polyamide 12 (PA 12), polyamide 4.6 (PA 4.6), acrylonitrile butadiene styrene (ABS), polycarbonates (PC), polyethylene (PE), polypropylene (PP), polyphenylene sulfide (PPS), polyvinyl chloride (PVC), acrylonitrile styrene acrylates, polyurethanes, epoxy resins, and mixtures thereof.

Another preferred variant of the inventive method is characterized in that the shaping process in step c) is selected from the group consisting of extrusion processes, granulation processes, extrusion processes, cutting processes, and combinations thereof. 3D printing filaments can be produced using an extrusion process and 3D printing granulates can be produced using a granulation process. 3D printing rods can be produced by first carrying out an extrusion process and then cutting the resulting material in a cutting process.

Preferably the inventive method for producing 3D printing material is a method for producing 3D printing material in accordance with this invention.

This invention also relates to a 3D printing material comprising a thermoplastic matrix and, embedded in the matrix, a composite material that contains at least one photocatalyst and at least at least one phyllosilicate.

The term 3D printing material is understood to mean a material that can, without further processing, be directly used in a 3D printer as a starting material for 3D printing, so that using the 3D printer it is possible, by means of 3D printing, to produce components from the 3D printing material. Thus, the 3D printing material is suitable (because of its composition and its shape) for direct use in a 3D printer. The 3D printing material can be selected, for example, from the group consisting of 3D printing filaments (that is, filaments for 3D printing), 3D printing granulate (that is, granulate for 3D printing), and 3D printing rods (that is, rod-shaped material for 3D printing). The 3D printing filaments can be FFF filaments (fused filament fabrication filaments). The rod-shaped material for 3D printing can, like the filaments for 3D printing (continuous semi-finished product) be produced in an extrusion process, the material being cut to defined lengths after the extrusion to produce the rod-shaped material.

The term thermoplastic matrix is understood to mean a matrix that contains or consists of at least one thermoplastic polymer.

Because of the photocatalyst-phyllosilicate composite that is embedded (in the form of a filler) in the thermoplastic polymer, the inventive 3D printing material comprises a photocatalyst-phyllosilicate-polymer composite, giving the 3D printing material itself very effective self-decontaminating activity. Consequently, a component or semi-finished product produced by means of 3D printing from the 3D printing material also has, in and of itself, very effective self-decontaminating activity. Thus, the component no longer needs to be provided with an additional photocatalytic coating, that is, a coating having antibacterial and/or antiviral activity, to achieve a decontaminating effect and achieve protection against bacteria and viruses. Instead, the component has very effective protection against bacteria and viruses even without such a coating. Forgoing the additional coating of the component allows it to be produced much more quickly and economically.

A preferred embodiment of the inventive 3D printing material is characterized in that the at least one photocatalyst is selected from the group consisting of $TiO_2$, ZnO, $SnO_2$, $WO_3$, $Fe_2O_3$, $Fe_3O_4$, MnO, NiO, and mixtures thereof; and/or is doped with at least one metal, the at least one metal preferably being selected from the group consisting of Ag, Cu, Au, Pd, Pt, Rh, Cd, and mixtures thereof.

Another preferred embodiment of the inventive 3D printing material is characterized in that the at least one phyllosilicate is selected from the group consisting of hectorite, bentonite, montmorillonite, muscovite, illite, kaolinite, halloysite, palygorskite, vermiculite, and mixtures thereof; and/or is in the form of oriented and/or curved lamellae.

The term oriented lamellae can be understood to mean planar, parallel lamellae. However, these lamellae can, depending on the process, also curve.

In an especially preferred embodiment of the inventive 3D printing material the at least one photocatalyst is $TiO_2$ and/or ZnO, especially $TiO_2$;

the at least one photocatalyst is doped with Cu and/or Ag, especially with Cu; and the at least one phyllosilicate is selected from the group consisting of hectorite, bentonite, montmorillonite, and mixtures thereof.

The at least one thermoplastic polymer is preferably at least one thermoplastic elastomer.

According to another preferred embodiment of the inventive 3D printing material, the at least one thermoplastic polymer is selected from the group consisting of polyamide 6 (PA 6), polyamide 66 (PA 66), polyamide 12 (PA 12), polyamide 4.6 (PA 4.6), acrylonitrile butadiene styrene (ABS), polycarbonates (PC), polyethylene (PE), polypropylene (PP), polyphenylene sulfide (PPS), polyvinyl chloride (PVC), acrylonitrile styrene acrylates, polyurethanes, epoxy resins, and mixtures thereof.

Another preferred embodiment of the inventive 3D printing material is characterized in that the 3D printing material contains 10 to 75 weight %, preferably 20 to 60 weight %, of the at least one thermoplastic polymer, relative to the total weight of the 3D printing material; and/or 10 to 60 weight %, preferably 20 to 50 weight %, of the at least one photocatalyst, relative to the total weight of the 3D printing material; and/or 5 to 40 weight %, preferably 10 to 30 weight %, especially preferably 10 to 20 weight %, of the at least one phyllosilicate, relative to the total weight of the 3D printing material.

According to another preferred embodiment of the inventive 3D printing material, the 3D printing material is in the form of a granulate (that is, a 3D printing granulate or a granulate for 3D printing), in the form of a filament (that is, a 3D printing filament or a filament for 3D printing), or in the form of a rod (that is, a 3D printing rod or rod-shaped material for 3D printing). The 3D printing filament can be an FFF filament (Fused-Filament Fabrication filament).

Another preferred embodiment of the inventive 3D printing material is characterized in that the 3D printing material can be produced or is produced using the inventive 3D printing material production method.

Furthermore, this invention also relates to the use of the inventive 3D printing material in injection molding processes, in extrusion processes, in rolling processes, in calendering processes, and/or in 3D printing processes, preferably in 3D printing layer manufacturing processes.

This invention additionally relates to a method for producing components, this method involving the production of 3D printing material according to the inventive method and producing, from the 3D printing material, at least one component by means of 3D printing, preferably by means of an additive fused deposition modeling method.

Thus, the inventive method for producing components involves a) producing, from at least one photocatalyst and at least one phyllosilicate, a photocatalyst-phyllosilicate composite;

b) producing, from the photocatalyst-phyllosilicate composite and at least one thermoplastic polymer, a photocatalyst-phyllosilicate-polymer composite;

c) subjecting the photocatalyst-phyllosilicate-polymer composite to a shaping process, yielding a 3D printing material; and d) producing, from the 3D printing material, at least one component by means of 3D printing, preferably by means of an additive fused deposition modeling process.

Furthermore, this invention also relates to a component production method that involves preparing an inventive 3D printing material or a 3D printing material that was produced according to the inventive method for producing 3D printing material, and producing, from the 3D printing material, at least one component by means of 3D printing, preferably by means of an additive fused deposition modeling process.

This invention further relates to a component comprising a thermoplastic matrix and, embedded in the matrix, a composite material that contains at least one photocatalyst and at least phyllosilicate, the component being produceable or produced according to the (or an) inventive method for producing components.

The inventive component can be an FFF component (Fused-Filament Fabrication) component.

In addition this invention also relates to the use of the inventive component in the area of medical engineering, life sciences, energy and environmental engineering, and/or in the automotive and aircraft industries.

The inventively used material feedstock can be detected by elemental analysis (EDX). The described composites can also be exactly determined by transmission electron spectroscopy (TEM) in combination with EDX. Further analysis methods are provided by X-ray diffractometry (XRD).

The following figures and examples are intended to explain this invention in detail, without limiting it to the specific embodiments and parameters shown here.

FIG. 1 is a schematic representation of a sample embodiment of the photocatalyst-phyllosilicate composite produced in step a) of the inventive method. The composite comprises a photocatalyst 1 (e.g., $TiO_2$ or ZnO), which is doped with a metal 2 (e.g., Cu or Ag); and a phyllosilicate 3 (e.g., hectorite, bentonite, or montmorillonite). The phyllosilicate 3 can be in the form of oriented and/or curved lamellae.

Figure 2:
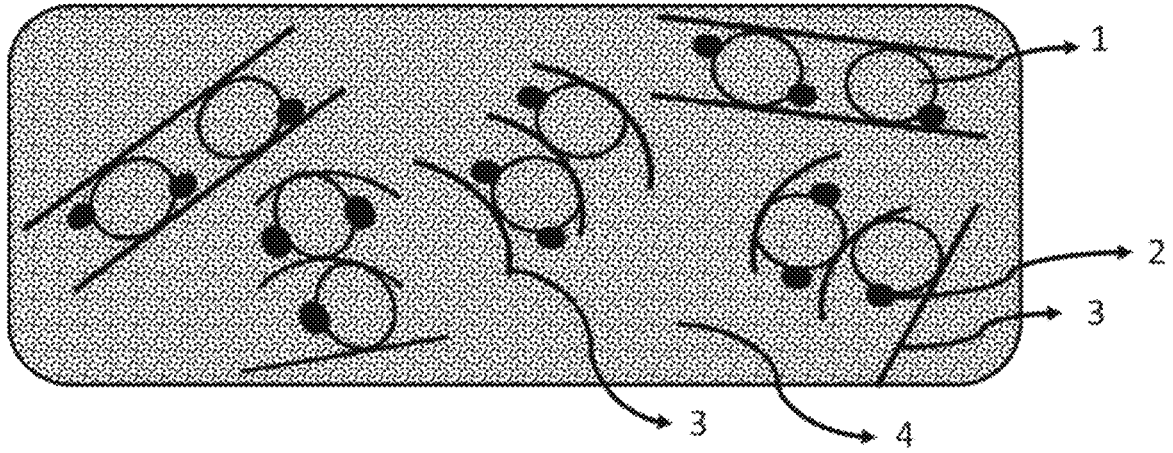
FIG. 2 is a schematic representation of a sample embodiment of the photocatalyst-phyllosilicate-polymer composite produced in the inventive method.

FIG. 2 is a schematic representation of a sample embodiment of the photocatalyst-phyllosilicate-polymer composite produced in the inventive method. The composite comprises a photocatalyst 1 (e.g., $TiO_2$ or ZnO), which is doped with a metal 2 (e.g., Cu or Ag); a phyllosilicate 3 (e.g., hectorite, bentonite, or montmorillonite); and a thermoplastic polymer matrix 4. The photocatalyst 1 doped with the metal 2 and the phyllosilicate 3, that is, the photocatalyst-phyllosilicate composite, are embedded in the thermoplastic polymer matrix 4. The phyllosilicate 3 can be in the form of oriented and/or curved lamellae.

SAMPLE EMBODIMENT 1: EFFECT AGAINST BACTERIA

The first step is to produce a photocatalyst-phyllosilicate composite as follows: 80 mL $H_2O$ are mixed with 20 mL propanol. To this solution is added 1 g of a ca. 40% nanoscale Cu nanoparticle dispersion, and the solution is mixed again. To this mixture are added 5 g of bentonite, and the preparation is then dispersed for 18 h with a magnetic stirrer. After that, 20 g $TiO_2$ are added, and the resulting mixture is dispersed for one hour. The preparation is dried at 60° C. for 12 h. The preparation is then milled in a powder ball mill for 30 minutes and then calcined at 200° C. for 1 h.

The second step involves compounding 30 g of the photocatalyst-phyllosilicate composite produced in this way and 30 g of Pebax® (thermoplastic elastomer (TPE-A)) in a co-rotating, 5-zone twin screw compounder at a temperature of T=225° C., to form a granulate.

The third step involves extruding the granulate through a single screw extruder at a temperature of 205° ° C. to produce FFF filaments having a diameter of 1.75 mm.

The fourth step involves using FFF printing to print 2.5 cm×2.5 cm test bodies.

The fifth step is to perform antibacterial tests. To accomplish this, three test samples are loaded with $10^6$ CFU/mL of the bacterium "*Escherichia coli*". The first test sample "Pebax® catalyst, printed", is provided by a Petri dish, in which is placed one of the test bodies produced in step four. The second test sample "Pebax® catalyst, pressed", is provided by a Petri dish, in which is placed a test body that was produced by hot pressing the filaments produced in the third step. The third test sample "control sample" is a Petri dish without a test body; this test sample is used as a control.

The three test samples loaded with $10^6$ CFU/mL of the bacterium "*Escherichia coli*" are irradiated with a light source having the spectrum of sunlight. Before irradiation (0 h), and 1 h and 2 h after irradiation, the bacterial concentration is measured. The measurement is optically determined, the bacteria being counted using a "Sorcerer Colony Counter".

Figure 3:
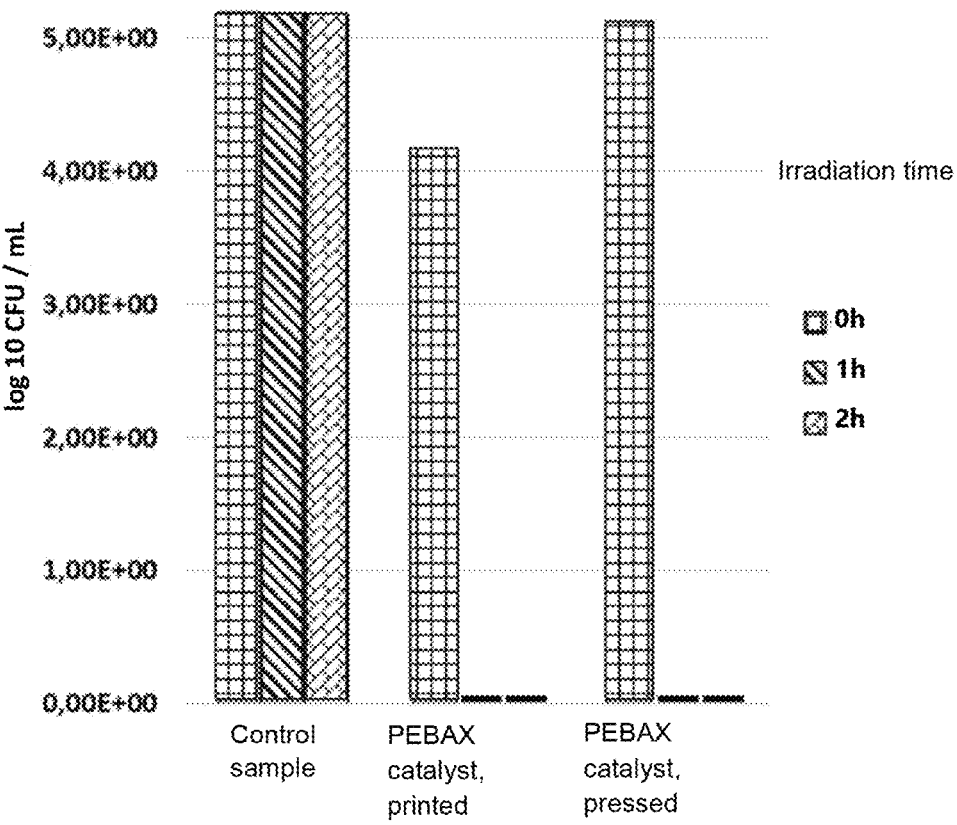
FIG. 3 is a bar chart showing the results of measurements of CFUs for different samples under different irradiation times.

The results of measurements are presented as a diagram in FIG. 3. It can clearly been seen that in the case of the samples "Pebax® catalyst, printed" and "Pebax® catalyst, pressed" the bacterial concentration decreases as the irradiation with the light source progresses. After just one hour, the bacterial concentration in both samples has decreased so much that "*Escherichia coli*" bacteria are no longer detectable. Even after two hours, no "*Escherichia coli*" bacteria were detectable in either sample. By contrast, in the control sample the bacterial concentration remains high, almost unchanged over the entire time.

Thus, the measurements that were made show an unambiguous reduction in bacteria on the sample "Pebax® catalyst, printed" and on the sample "Pebax® catalyst, pressed" during irradiation with light.

Figure 4:
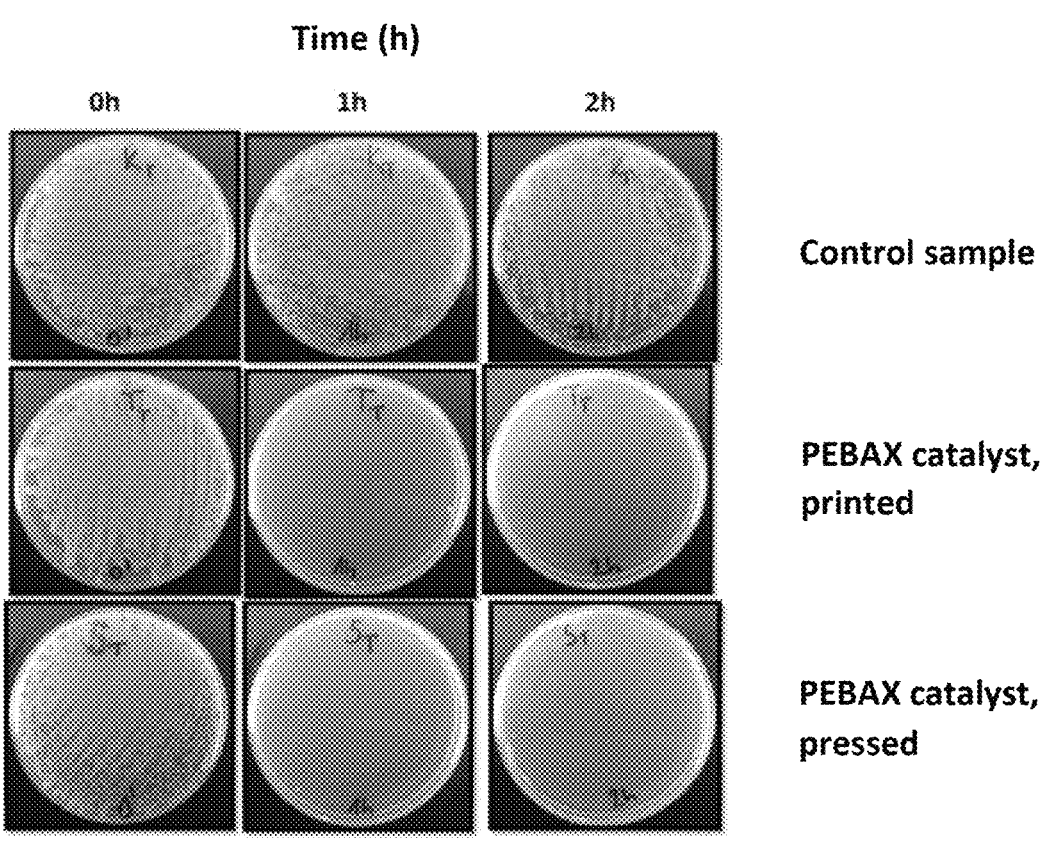
FIG. 4 shows photographs of test samples before irradiation (0 h), and 1 h and 2 h after irradiation.

This result is also illustrated by FIG. 4, which shows photographs of the test samples before irradiation (0 h), and 1 h and 2 h after irradiation. It can be seen that after 1 hour there has already been a clear reduction in the bacteria on the test surfaces of the sample "Pebax® catalyst, printed" and the test sample "Pebax® catalyst, pressed".

SECOND SAMPLE EMBODIMENT: EFFECT AGAINST VIRUSES

The first step is to produce a photocatalyst-phyllosilicate composite as follows: 80 mL $H_2O$ are mixed with 20 mL propanol. To this solution is added 1 g of a ca. 40% nanoscale Cu nanoparticle dispersion, and the solution is mixed again. To this mixture are added 5 g of bentonite, and the preparation is then dispersed for 18 h with a magnetic stirrer. After that, 20 g $TiO_2$ are added, and the resulting mixture is dispersed for one hour. The preparation is dried at 60° C. for 12 h. The preparation is then milled in a powder ball mill for 30 minutes and then calcined at 200° ° C. for 1 h.

The second step involves compounding 30 g of the photocatalyst-phyllosilicate composite produced in this way and 30 g of Pebax® (thermoplastic elastomer (TPE-A)) in a co-rotating, 5-zone twin screw compounder at a temperature of T=225° C., to form a granulate.

The third step involves extruding the granulate through a single screw extruder at a temperature of 205° C. to produce FFF filaments having a diameter of 1.75 mm.

The fourth step involves using FFF printing to print 5 cm×5 cm test bodies.

The fifth step is to perform antiviral tests. To accomplish this, four test samples are produced by taking four of the test bodies produced in step four, which have a geometry of 5 cm×5 cm, and loading them with $10^8$ viruses/mL of the herpesvirus "pseudorabies virus" (PVR).

Two of the loaded test samples are irradiated with a light source having the spectrum of sunlight, and two others are shaded.

All four samples are dried to the so-called desiccation point (DP).

One of the two samples irradiated with the light source and one of the two shaded samples are coated with a cell culture directly after drying. The two other samples are coated with a cell culture only 30 minutes after drying. Coating with the cell culture involves placing 1,000 μL of nutrient medium Dulbecco's modified Eagle's medium (DMEM) and PK-15 cell cultures on the samples.

After 72 hours the concentration of infected cells is optically determined, to determine the TCID50 (Median Tissue Culture Infectious Dose) value. The measurement is made by an optical determination that involves counting the cells with a Sorcerer Colony Counter.

Figure 5:
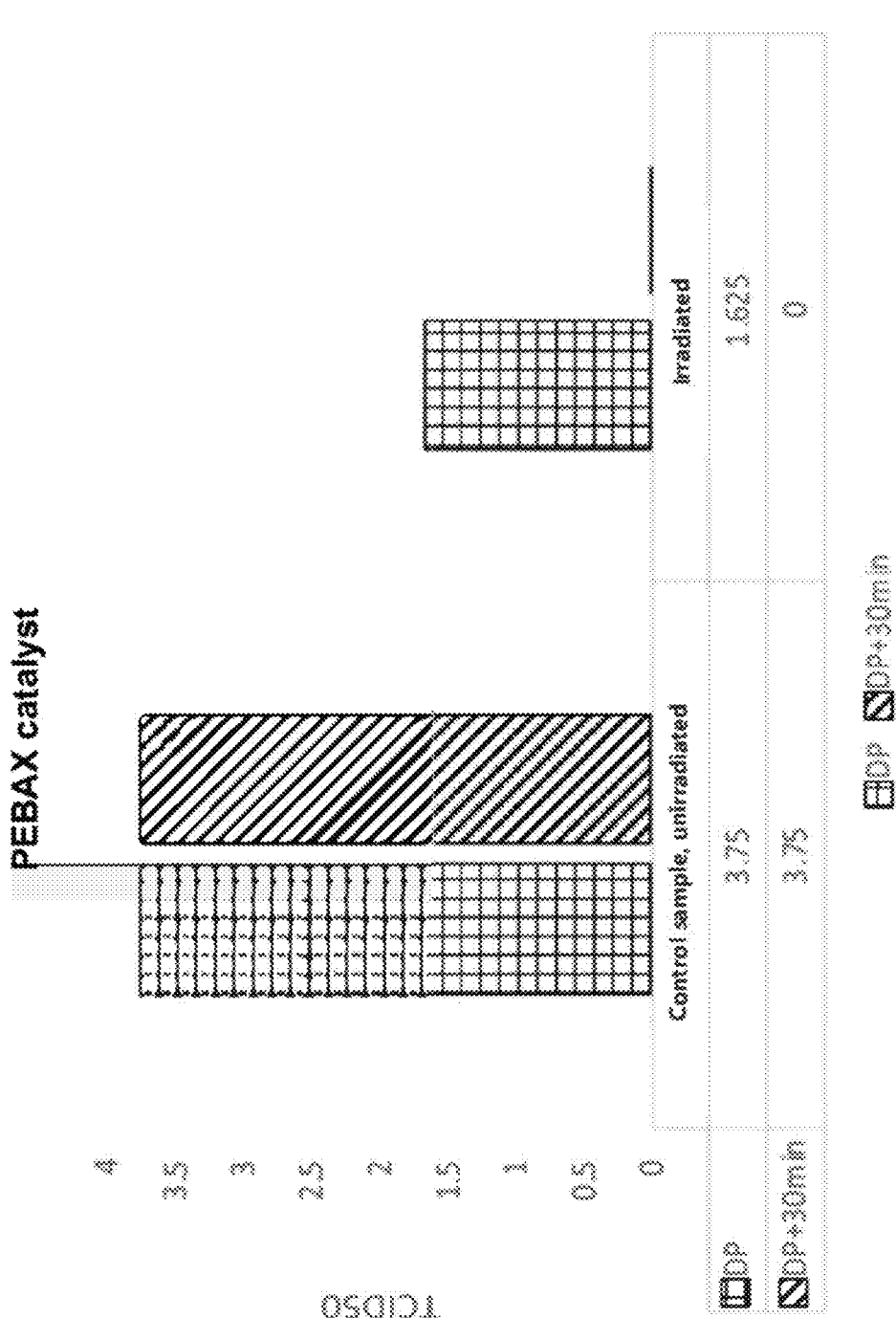
FIG. 5 is a bar chart showing the results of measurements of Median Tissue Culture Infectious Doses (TCID50s) of different samples before and after irradiation.

The results of the measurements are presented in the form of a diagram in FIG. 5. It can clearly be seen that the viral concentration decreases after irradiation with the light source. Thus, the two irradiated samples have a clearly lower viral concentration than the two shaded samples. In the case of the sample that was irradiated with the light source and that was coated with the cell culture only 30 minutes later (that is, 30 minutes after drying), no viruses or damaged cells are detectable. By contrast, in the case of the shaded samples, the viral concentration remains almost unchanged over the same time. Thus, it is clearly demonstrated that the virus breakdown is caused by the irradiation with the light source and not merely by the drying and waiting time.

Figure 6:
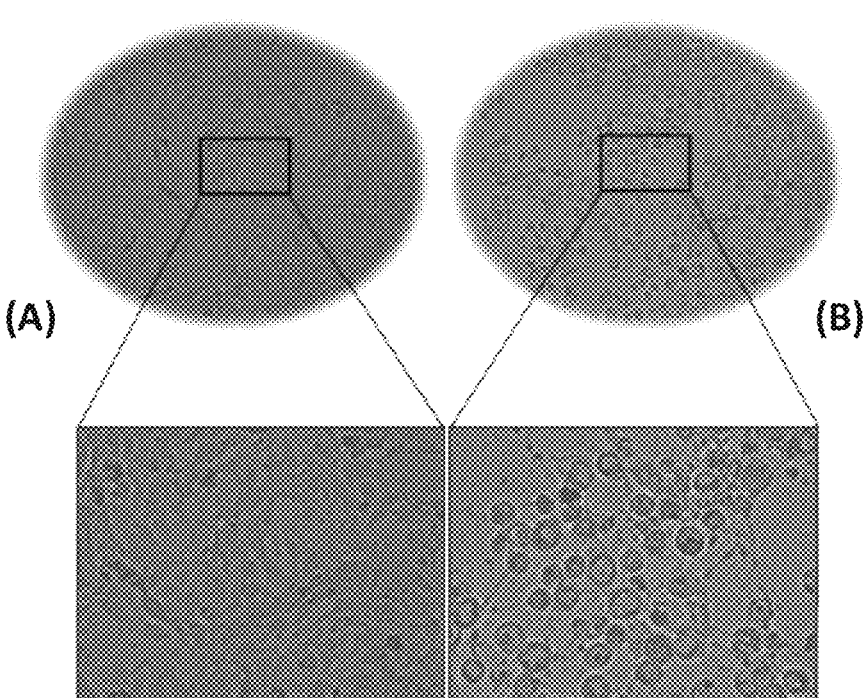
FIG. 6 shows sections of microscopic pictures obtained during measurement and used during counting.

In addition, FIG. 6 shows sections of microscopic pictures obtained during measurement and used during counting. In the left part (A), a section is shown of microscopic picture of the sample that was irradiated with light and coated with the cell culture 30 minutes after drying. This sample is free of viruses and has living cells. In the right part (B), a section is shown of microscopic picture of the sample that was shaded and coated with the cell culture 30 minutes after drying. This sample has infected cells and cells killed by the virus (round spots).

Thus, the measurements that were made prove unambiguous destruction of viruses during irradiation by light.

The invention claimed is:

1. A 3D printing material comprising at least one thermoplastic matrix polymer and embedded in the at least one thermoplastic matrix polymer, a composite material containing at least one photocatalyst selected from the group consisting of $TiO_2$, ZnO, $SnO_2$, $WO_3$, $Fe_2O_3$, $Fe_3O_4$, MnO, NiO, and mixtures thereof, and at least one phyllosilicate selected from the group consisting of hectorite, bentonite, montmorillonite, muscovite, illite, kaolinite, halloysite, palygorskite, vermiculite, and mixtures thereof, wherein the 3D printing material is in a form of a granulate, a filament, or rods, and the 3D printing material contains 10 to 60 weight % of the at least one photocatalyst and 5 to 40 weight % of the at least one phyllosilicate, relative to the total weight of the 3D printing material.

2. The 3D printing material of claim 1, wherein the at least one photocatalyst is also doped with at least one metal.

3. The 3D printing material of claim 1, wherein the at least one phyllosilicate; is in a form of oriented and/or curved lamellae.

4. The 3D printing material of claim 1, wherein the at least one thermoplastic matrix polymer is selected from the group consisting of polyamide 6 (PA 6), polyamide 66 (PA 66), polyamide 12 (PA 12), polyamide 4.6 (PA 4.6), acrylonitrile butadiene styrene (ABS), polycarbonates (PC), polyethylene (PE), polypropylene (PP), polyphenylene sulfide (PPS), polyvinyl chloride (PVC), acrylonitrile styrene acrylates, polyurethanes, epoxy resins, and mixtures thereof.

5. The 3D printing material of claim 1, wherein the 3D printing contains:

−10 to 75 weight % of the at least one thermoplastic matrix polymer, relative to the total weight of the 3D printing material;

20 to 50 weight % of the at least one photocatalyst, relative to the total weight of the 3D printing material; and/or 10 to 20 weight % of the at least one phyllosilicate, relative to the total weight of the 3D printing material.

6. The 3D printing material of claim 1, wherein the 3D printing material is produced by:

a) producing, from at least one photocatalyst and at least one phyllosilicate, a photocatalyst-phyllosilicate composite;

b) producing, from the photocatalyst-phyllosilicate composite and at least one thermoplastic matrix polymer, a photocatalyst-phyllosilicate-polymer composite; and c) subjecting the photocatalyst-phyllosilicate-polymer composite to a shaping process, producing a 3D printing material.

* * * * *